US005749675A

United States Patent [19]

Ferrari

[11] Patent Number: 5,749,675

[45] Date of Patent: May 12, 1998

[54] UNDERGROUND TANK FOR STORAGE OF LIQUIDS AT AMBIENT TEMPERATURE AND LOW TEMPERATURE LIQUIFIED GASES

[75] Inventor: Franco Ferrari, Rome, Italy

[73] Assignee: Ing Nino Ferrari-Impresa Construzioni Generale SRL, Italy

[21] Appl. No.: 516,103

[22] Filed: Aug. 17, 1995

[30] Foreign Application Priority Data

Nov. 17, 1994 [IT] Italy .............................. GE94A0129
Apr. 14, 1995 [IT] Italy .............................. GE95A0040

[51] Int. Cl.[6] .............................. B65G 5/00; E21F 17/16

[52] U.S. Cl. .............................. 405/52; 405/53; 405/55; 220/484

[58] Field of Search .............................. 405/52, 53, 54, 405/55, 146; 220/484

[56] References Cited

U.S. PATENT DOCUMENTS

| | | | |
|---|---|---|---|
| 4,239,416 | 12/1980 | Borca et al. | 405/53 |
| 4,915,545 | 4/1990 | Ferrari | 405/53 |
| 4,918,978 | 4/1990 | Green | 405/54 X |
| 5,330,288 | 7/1994 | Ferrari | 405/55 |

*Primary Examiner*—Tamara L. Graysay
*Assistant Examiner*—Tara L. Mayo
*Attorney, Agent, or Firm*—Graham & James LLP

[57] ABSTRACT

Underground storage tank consisting of an internal metal structure (1), a static external facing (2) in contact with the surrounding soil (3) and a filler (5) located between the metal structure (1) and the static facing (2), the filler (5) being stabilized by a netting (6) secured onto the metal structure (1) by joint plates (7), while the netting is embedded in the filler (5) which is thickened by charging vessels (18) combined with feed bushes (15) through which the filler (5) is poured into the cavity wall. For Liquid Gas Low Temperature Storage Tanks, the transverse channels (4) for detection and drainage of any leaks are consisting of two omega shaped sections (21, 22) whereas blown or non-blown bitumen to which polymers are added is used as a filler (5).

14 Claims, 6 Drawing Sheets

UNDERGROUND TANK FOR STORAGE OF LIQUIDS AT AMBIENT TEMPERATURE AND LOW TEMPERATURE LIQUIFIED GASES

This invention covers an underground tank for storage of liquids of any nature whatsoever, including liquids that are stored at ambient temperature as well as liquid gases to be stored at very low temperature, as LPG (liquid petroleum or propane gas).

These tanks are usually cylindrical with a horizontal axis and they consist of an internal metal containment structure, an external static facing in plain or reinforced concrete in touch with the soil and a filler located between the metal containment structure and the static facing.

Large underground storage tanks are usually built with hot press rolled metal elements or large sized rings. Transverse and longitudinal channels are obtained by placing the rings next to each other but properly spaced with the aid of omega sections and flats for easy detection and drainage of leaks.

The metal containment structure is supported by the external plain or reinforced concrete facing by means of—usually insulating—U-bolts and a filler is poured or injected in the hollow space between the metal structure and the static facing.

According to EP-A-O 325 683 and the corresponding patent U.S. Pat. No. 4,915,545, an important advantage in building such large sized underground tanks can be achieved if the system, for optimum stability purposes, is conceived as a metal containment structure, static facing, filler and surrounding soil forming one single interacting complex structure so that all its components are directly contributing to the structural stability of the tank.

By meeting these requirements, the resistance parameters and thickness of the metal structure and of the static facing may be reduced and this in turn will reduce the quantity of material required for the structure.

According to the above patents, the filler, after cooling, shall be neither too fluid and deformable nor too compact and rigid. An excessive fluidity or deformability would be unable to counteract deformation of the metal plates and to transfer the stresses to the outer static facing and vice-versa, while an excessive rigidity and compactedness of the filler might cause brittleness cracks or fissures and failure due to structural non-uniformity.

The filler shall therefore have adequate viscoelastic characteristics and shall be able to transfer deformation strains from the metal structures to the external facing so that it may actively contribute to the stability of the whole tank while the metal structure will contribute, though to a lesser extent, to withstand the stresses of the surrounding soil on the static facing.

It follows that the four tank components, i.e. the metal structure, filler, static facing and the soil shall mutually interact and form one single structural assembly that defines the stability of the construction work, also in view of seismic stresses.

Hot blown bitumen was found to be the most suitable filler for this purpose, since it has viscoelastic characteristics when poured or injected in the hollow space through openings in the metal plating that are properly closed after filling. The characteristics of this bitumen are described hereinafter.

When using this material to fill the hollow space between the metal structure and the static facing so that it will interact with the tank components and the surrounding soil, it will be possible to design the metal structure as well as the facing with lower strength sections than required by former design criteria which considered these components as acting independently, while protecting at the same time the metal structure from corrosion.

As said before, the bitumen shall perfectly adhere to the static facing and to the metal structure and shall completely fill all voids between these structures in order to obtain one single structural assembly formed by the external static facing, metal structure, bitumen and surrounding soil.

Normally, these conditions are complied with, but a partial and localized detachment and an imperfect adhesion to the static facing and metal structure may occur especially in the upper zones of large sized tanks, due to contraction of the filler during its cooling down and settling phase.

According to the Patent EP-A-O 567 902 and corresponding U.S. Pat. No. 5,330,288, this phenomenon is partially counteracted by welding numerous sections, usually round bars, to the outer surface of the rings of the metal structure, to increase the bond between plates and bitumen.

During pouring of the blown bitumen, the pressure acting on the filler remains however lower in the upper tank zones so that the bitumen may still break away from the static facing and from the metal structure, due to contraction and settling. Furthermore the currently adopted pouring or injection system through openings in the metal structure may cause some difficulties in the upper tank zones.

According to this invention, these problems are eliminated or at least reduced by fixing a properly spaced and usually electrowelded netting of known type concentrically to the rings of the metal structure. The netting is secured to the rings by flats, lengthwise positioned with respect to the tank and welded to the outer ring surface to which the net is welded. Thus, the netting is embedded in the filler and will act as a stabilizing reinforcement, preventing or at least minimizing contraction of the filler and its detachment from the containment walls according to the objectives of this invention. Furthermore, special sections, usually round bars, are welded to the omega sections, thus forming channels for drainage of leaks and spills. These round bars are welded parallel to the tank axis to hold the netting and prevent its deformation and its contact with the external static facing.

This is indispensable to ensure geometric continuity of the netting at channel level and to prevent corrosive stray currents from passing through the static facing and metal structure, the latter being supported by the static facing by means of U-bolts, usually insulated to prevent stray-currents.

The netting embedded in the filler is also useful if the spacing between the metal structure and static facing is non uniform due to uneveness of the static facing during construction.

Furthermore, according to this invention, special devices permit the hot filler to be charged into the cavity wall through simple feed bushes or through bushes provided with a charging vessel so as to further complete saturation and a perfect bond of the filler to the metal structure and static facing; the charging vessel has also the aim to increase the charging pressure on the filler, especially in the upper part of the tank.

The filler is let into the hollow space through the evenly spaced feed bushes passing through the central flat portion of the omega shapes.

In detail, some of the omega shapes are fitted with evenly spaced simple feed bushes whereas those provided with a charging vessel are located in the upper part of the tank, always in the central flat section of the omega shape.

The improved saturation of the filler, its viscoelastic characteristics, its better bond to the static facing and to the metal structure forming the cavity wall also improve tank resistance to seismic strains.

In particular, the above also holds true for liquid gas stored at low temperature, but in this case, the transverse channels for detection and drainage of leaking liquids and/or vapor and/or gas are formed, according to this invention, by two parallel and superimposed omega sections welded to the edge of the transverse rings with respect to the tank axis, so that the tank structure can absorb and compensate for any expansion caused by thermal gradients, i.e. the difference between ambient temperature (+20° C.) and the temperature required for storage of the liquid gas (at least −45° C.). Therefore, free deformation of the rings during temperature variations will be permitted by deflection and expansion of the two omega sections of each transverse channel.

In addition, according to this invention, a liquid and/or vapor and/or gas leak detector is mounted in the lower radial zone of each transverse channel formed by two omega shapes and also by one omega shape and one internal flat. All leak detectors of the transverse channels are linked up to a central monitoring unit so that not only any leakage but also its location are indicated.

Furthermore, according to this invention, hot blown or simple bitumen to which an additive is added is used as a filler between the metal containment structure and the static facing. The filler shall have suitable viscoelastic properties both at ambient and at liquid gas storage temperature. According to this invention, polymers such as styrenebutadiene and/or ethylvinylacetate or the like are added to the hot blown or simple bitumen so as to ensure sufficient viscoelasticity of the filler at the above mentioned low temperatures.

The invention in question is illustrated in its practical and exemplifying implementation in the enclosed drawings in which.

Figure 9:
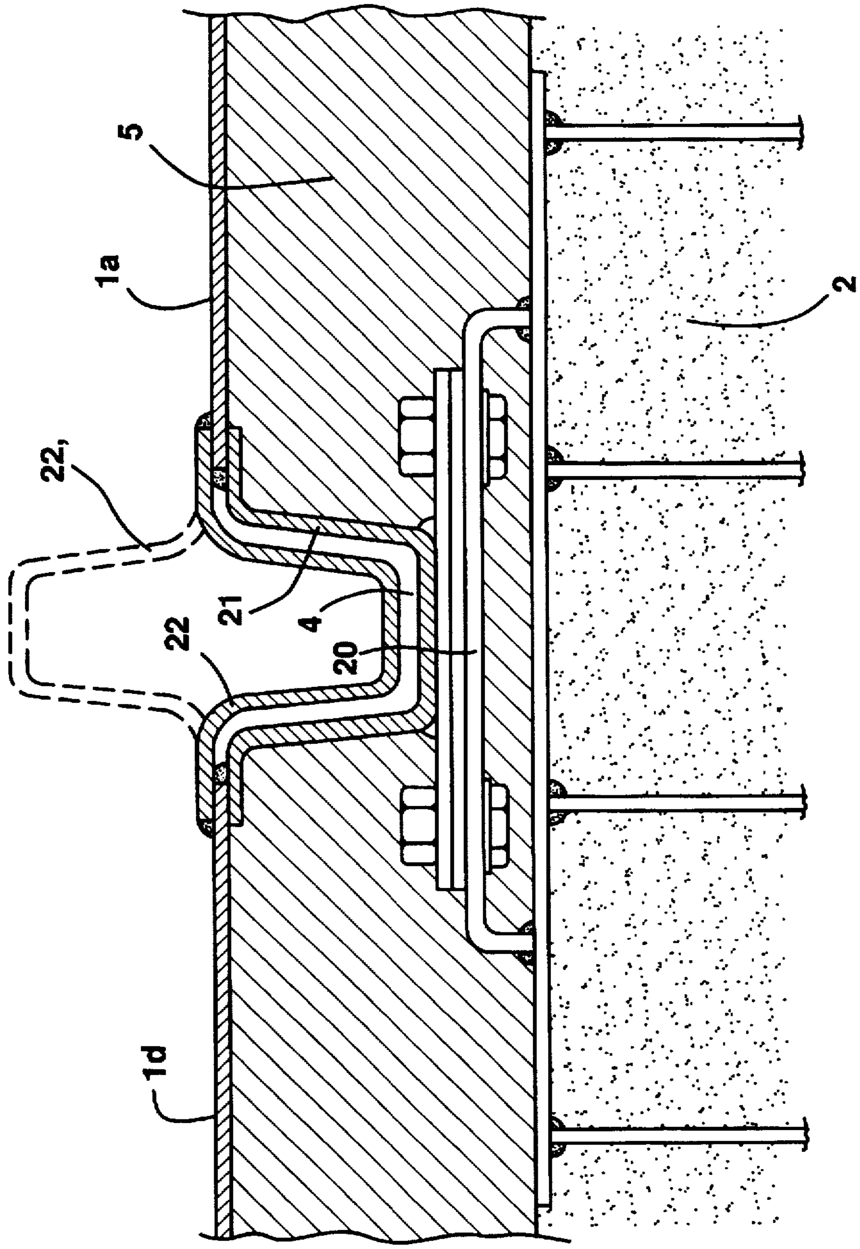

FIG. 9 shows a longitudinal section of a leak location and drainage channel formed by two omega shapes, With reference to the above figures, 1 indicates the metal structure of the tank, 2 is the static facing in plain or reinforced concrete and 3 is the soil surrounding the static facing. The metal structure 1 is supported inside the static facing 2 by insulating U-bolts 20 secured onto the facing 2 on which the omega shaped leak location and drainage channels 4 are mounted. The filler 5 is poured or injected into the hollow space between the metal structure 1 and the static facing 2.

Hot blown bitumen is used as a filler 5 and is hot poured according to known techniques, through small openings that can be closed. This filler material, i.e. hot blown bitumen, has the aim to transmit the stresses and strains from the metal structure 1 to the static facing 2 and vice-versa; these stresses are due to deformation of the metal structure during filling or emptying of the tank.

It has been found that hot-blown bitumen is particularly suitable for this purpose since it has the following average characteristics:

| | |
|---|---|
| penetration depth at 25° C. | 10–30 dmm |
| softening point | 80°–115° C. |
| Fraas breakpoint | −12–+10 C. |
| ductility at 25° C. | min 2 cm |
| flash point | min 240° C. |
| specific gravity at 25°/25° C. | 1.01 ÷ 1.10 gr/cm3 |

After cooling down, this bitumen has sufficient viscoelasticity to transfer stresses to the tank components, without causing failure or permanent deformation and the bitumen is pumped into the hollow space at a temperature ranging between 200° and 220° C. so as completely to fill the space between the metal structure and the static facing.

Obviously, this bitumen may be replaced by other filler material, provided it can be easily poured or injected and meets the above mentioned requirements, has sufficient plasticity to withstand the stresses and strains in the tank components and can protect the outer surface of the metal structure from corrosion.

As said before, utilization of this filler guarantees the overall stability of the tank with its metal structure and static facing, the main sections of which may now be calculated for a lower strength than hitherto required by design criteria.

Particularly important is the possibility to build the metal structure 1 with rings having a lower thickness, thus significantly reducing the cost of assembly and of the finished plant.

Figure 1:
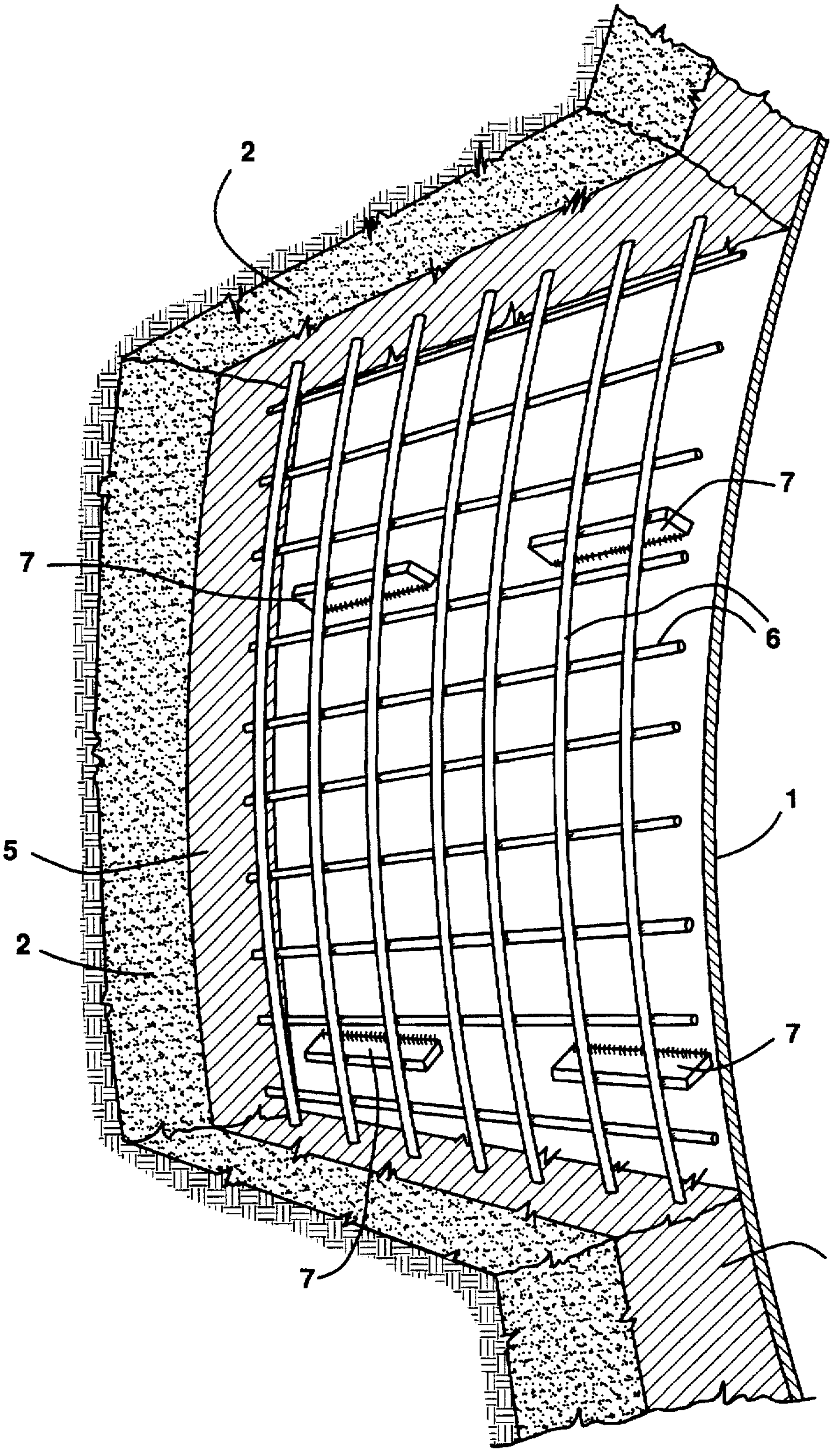
FIG. 1 shows a perspective sectional view of the underground storage tank, the metal component of which is provided with netting to stabilize the filler.

According to this invention and as shown in FIG. 1, a netting 6 is secured to the outer surface of the metal structure 1 with the aim to stabilize the filler 5 and to counteract contraction due to cooling and settlement of the filler while improving its compactedness. In particular, flat joint plates 7 placed lengthwise with respect to the tank axis are welded onto the metal structure 1, while the netting 6 is welded to these joint plates. The netting thus remains at a certain distance from the metal structure 1 and is embedded in the filler 5.

Figure 2:
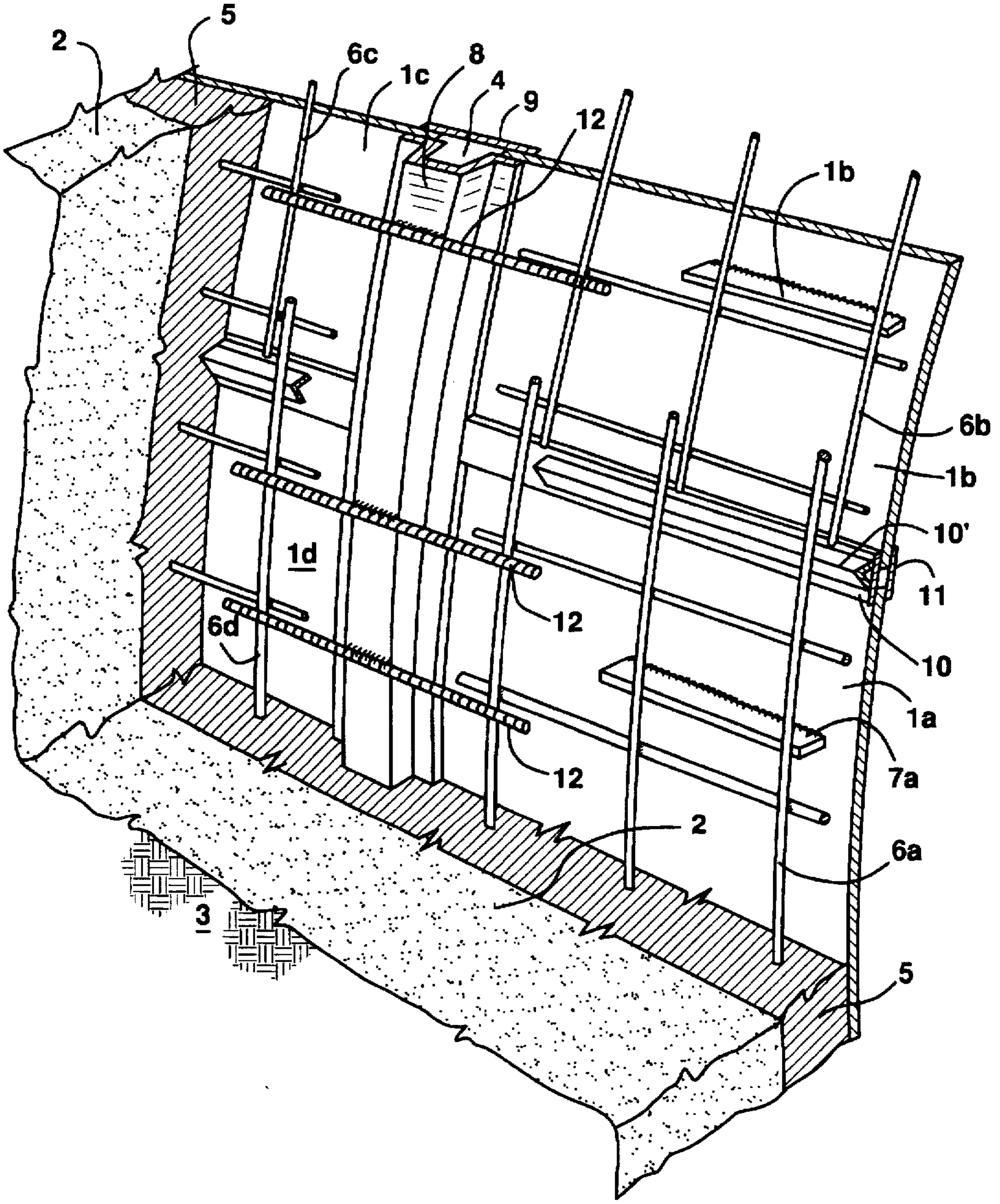
FIG. 2 shows a perspective sectional view of the tank structure at the node of the four rings and of the corresponding transverse and longitudinal leak drainage and location channels.

It should be observed that the netting 6 is acting, just like reinforced concrete, as a reinforcement of the filler 5 so that any deformations of the metal structure are more easily and directly transmitted to the filler 5 and by the latter to the static facing 2 and vice-versa, thus greatly improving the structural stability of the tank with the cooperation of all its components. In detail, as shown in FIG. 2, each ring of the metal structure 1 is completed before it is assembled with the netting 6 so that each ring 1*a*, 1*b*, 1*c*, 1*d* is provided with the joint plates 7*a*, 7*b*, 7*c*, 7*d* and its nets 6*a*, 6*b*, 6*c*, 6*d*. The rings are then assembled by partial overlap of the nets welded to the rings 1*a*, 1*b*, 1*c*, 1*d* all located on the same circumference.

Figure 5:
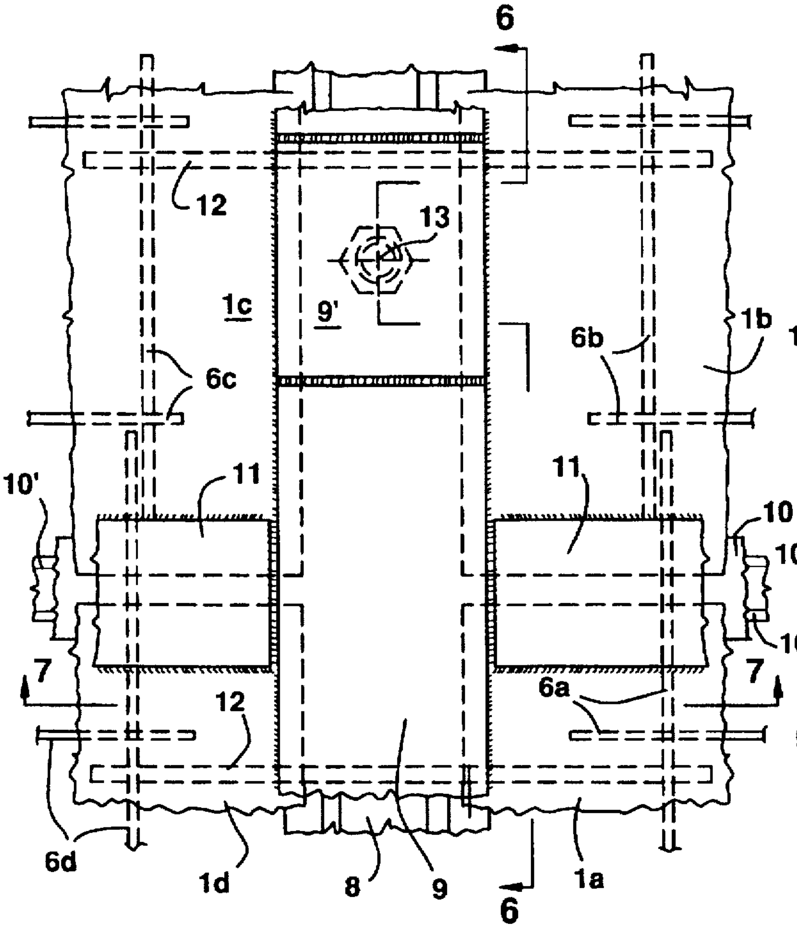
FIG. 5 shows an external front view of the node illustrated in FIG. 2 and featuring the filler feed bush.
Figure 6:
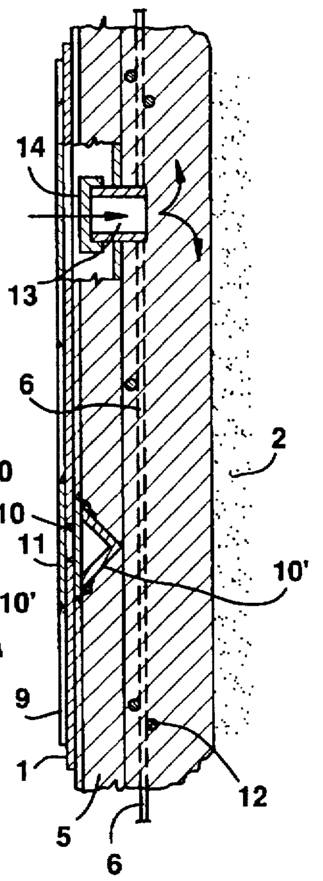
FIG. 6 shows the node section according to VI—VI in FIG. 5
Figure 7:
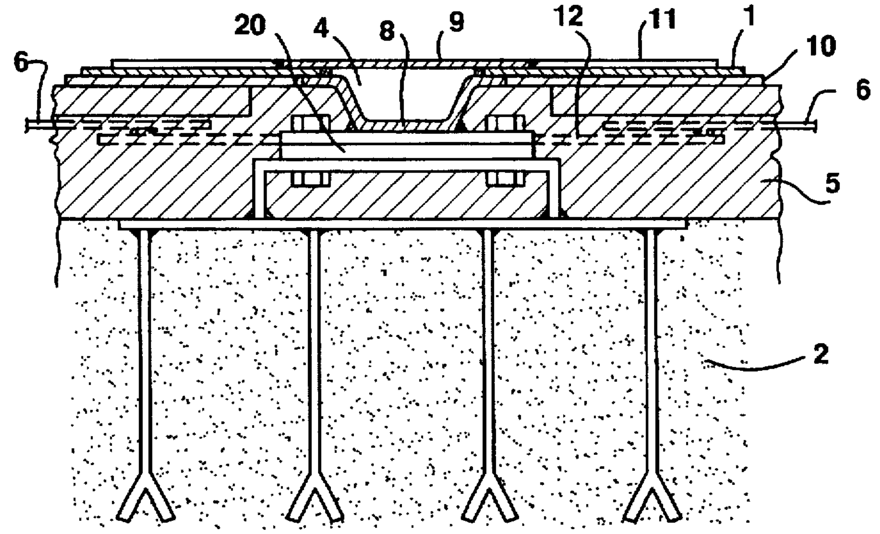
FIG. 7 shows the node section according to VII—VII in FIG. 5.

FIGS. 2 and 5 show the omega shaped transverse channels and related flats 9 forming transverse drainage channels 4 for storage tanks at ambient temperature, as well as the flat 10, 11 forming longitudinal drainage channels. These channels are formed at the edges of the rings 1*a*, 1*b*, 1*c*, 1*d* which are slightly spaced.

According to this invention, round bars 12 are lengthwise welded to the omega shapes 8; these round bars 12 are resting on the transverse ends of the nets 6*a*, 6*b*, 6*c*, 6*d* and are also embedded in the filler 5 in order to provide geometrical continuity of the netting along the omega sections 8 and keep the netting in position, preventing it from coming in touch with the static facing 2 since this contact might cause eddy currents between the static facing 2 and the metal structure 1.

From this invention, it follows that the netting 6 provides a better bond between the metal structure 1 and the filler 5, counteracting its contraction due to cooling and settlement. It also improves the bond between the filler 5, the static facing 2 and the metal structure 1.

In the practice, however, filler contraction still occurs and is significant in the upper part of the tank, where there is less charging pressure during the hot pouring phase, while the horizontal section of the layer increases. Therefore, the netting may be placed either on the whole tank circumference or only in the upper tank zone according to need.

According to this invention, an additional load may also be applied to the filler 5 to improve its saturation and adhesion to the walls.

Figure 3:
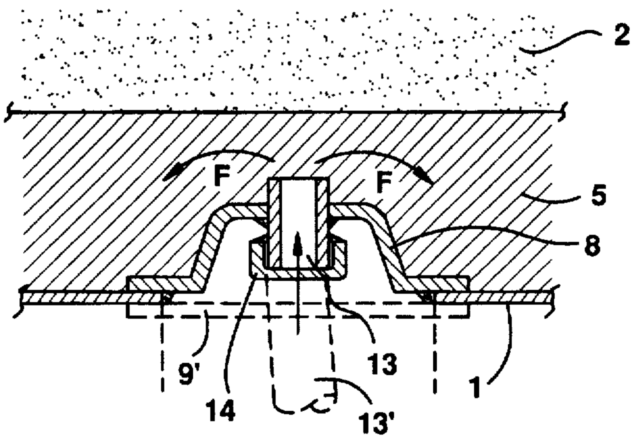
FIG. 3 shows a cross section of a feed bush through which the filler is let into the cavity, located at the level of a transverse omega channel.

FIG. 3 shows how hot blown bitumen is charged through the feed bush 13 provided with screw cap 14 through the transverse omega shape 8 onto which the feed bush is welded.

The hot blown bitumen is pumped through the duct 13' into the feed bush 13 and is distributed according to the arrow F inside the hollow space between the static facing 2 and the metal structure 1, forming superimposed filler layers 5.

A small length of the flat 9' has to be removed from inside the drain channel 4 so that it will be possible to pour the hot blown bitumen into the cavity wall. This flat section is returned to its former position after filling and closing with the screw cap 14.

Figure 4:
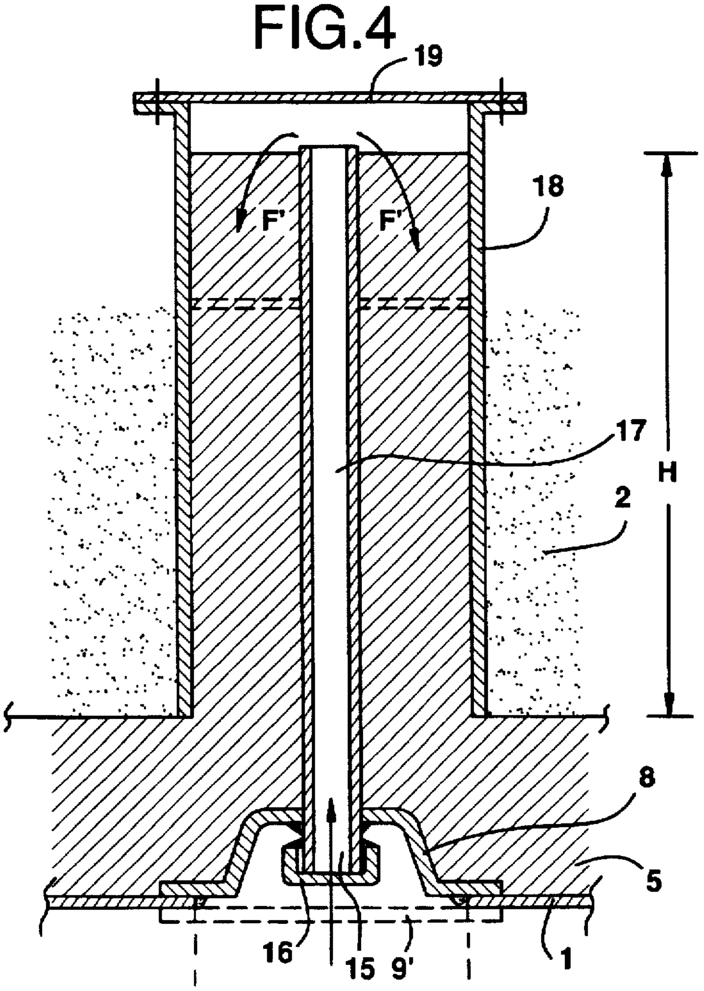
FIG. 4 shows a vertical cross section of a feed bush fitted with a thickening and charging vessel, during hot pouring of the filler.

FIG. 4 shows the feed bush 15 and screw cap 16, likewise secured and passing through the omega shape 8 as shown in FIG. 3, consisting of a vertical pipe length 17 surrounded by a vessel 18 which may have any shape, closed at the top by an end plate 19 and open at the bottom. The hot blown bitumen is charged in direction of the arrow F' and remains inside the vessel 18, 19 up to a prefixed bitumen level H determining the load on the material during the charging operation.

Obviously, the feed bushes 13 and 15 as well as the charging vessel 18 are fitted with accessories for their easy and stable installation on the omega section 8.

Simple feed bushes 13 are welded onto the omega sections whereas other bushes 15 and the charging vessel 18 are mounted on top of the tank.

The charging vessel 18 may have any height based upon the load to be applied to the filler during pouring. The vessel 18 may also be completely or partially incorporated in the static facing 2.

From the foregoing, it follows that the stabilizing netting 6 and/or the use of feed bushes 15 fitted with a charging vessel will permit completely to eliminate or at least to minimize the drawbacks resulting from a poor bond between the bitumen and the upper zones of the metal structure 1 and of the static facing 2, thus ensuring structural continuity of the various tank components, according to the objectives of this invention.

Figure 8:
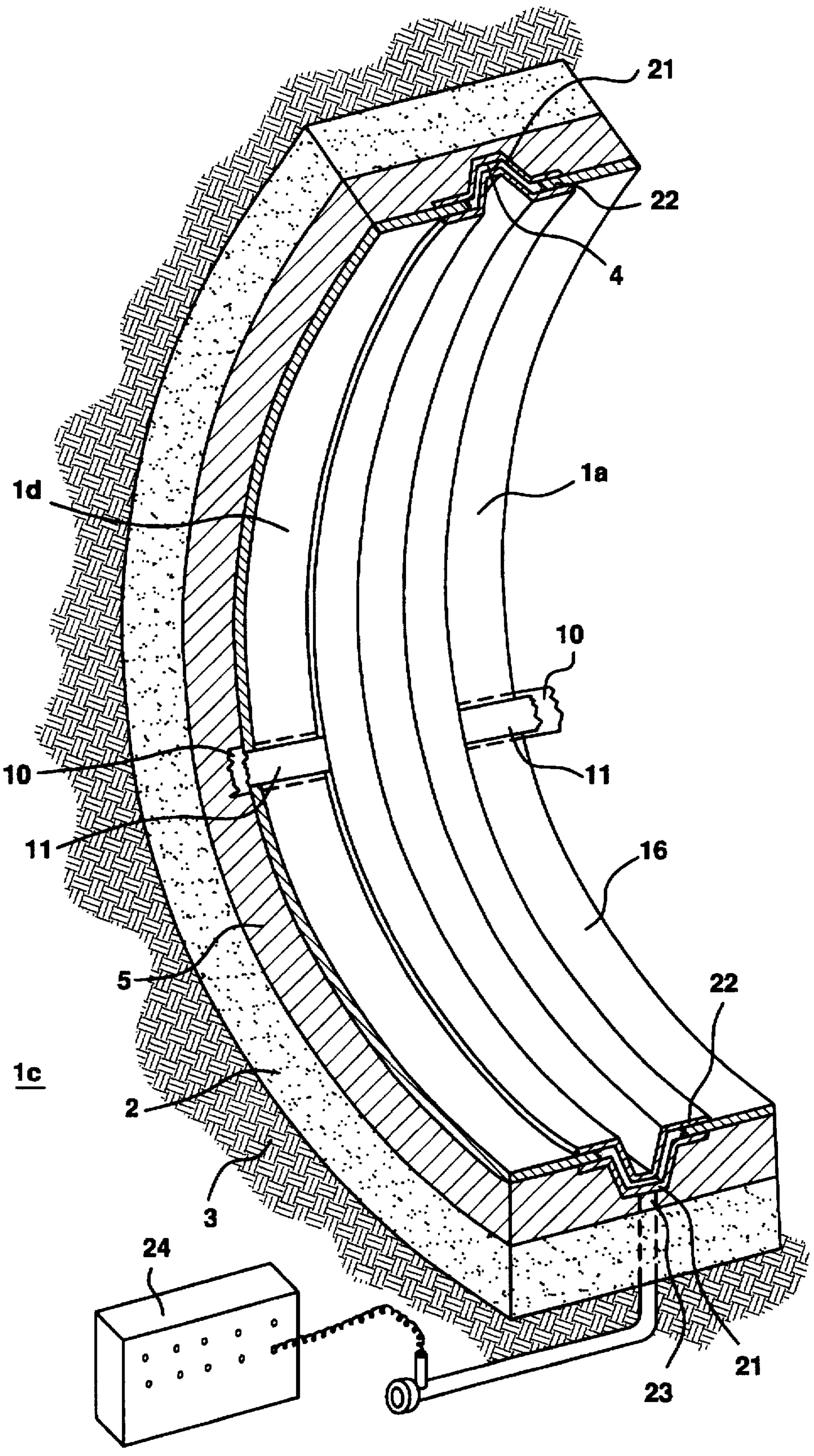
FIG. 8 shows a perspective sectional view of the tank structure for liquid gas stored at low temperature, provided with a transverse channel for location and drainage of leaks formed by two omega shapes.

In the case of tanks for low temperature stored liquid gases, illustrated in FIGS. 8 and 9, this invention provides for transverse channels 4 that will permit detection and drainage of any liquid gas leaks. These transverse channels 4 are consisting of two omega shapes 21, 22 welded onto the transverse facing edges of two slightly spaced plates 1*a*–1*d*, 1*b*–1*c*. These omega sections 21, 22 are usually placed in a parallel concentric position, as shown in the drawings.

These transverse channels formed by two omega sections 21, 22 will compensate and absorb the thermal deformations of tanks in which liquid gas will be stored at very low temperature.

The internal omega shape 22 may also be positioned upside-down as illustrated by the dashes 22' in FIG. 9. Although this will slightly reduce the tank volume, it still has the advantages deriving from the compression and expansion movements of both omega sections 21, 22 so that strains are better balanced. Each transverse channel 4 for detection and drainage of gas leaks is fitted with a leak probe 23 located in the lower radial zone of the channel for easy detection of liquid and/or vapour and/or gas in the channels; all probes 23 of the various transverse channels are linked up to a central monitoring stations 24. This central monitoring unit 24 will locate any leaks which may thus be promptly eliminated.

The longitudinal channels, consisting of flats 10, 11 welded onto the longitudinal edges of the rings 1*a*–1*b*, 1*c*–1*d*, are fitted with partitions and are thus linked up to the adjacent transverse sections 4.

According to this invention, the filler 5 to be used for the low temperature liquid gas storage tanks is a hot blown material injected or poured into the hollow space between the metal plating 1 and the static facing 2, through openings or feed bushes. As said before, this material shall have a tamping action and shall completely fill and tamp the filler in the hollow space between the metal structure 1 and the static facing 2; it shall have suitable viscoelastic properties to transfer stresses and strains from the metal structure to the static facing and vice-versa, so that all tank components will contribute to the static stability of the tank.

According to this invention, bitumen, whether hot-blown or not, is preferably used as a filler, with additives having the aim to prevent the formation of discontinuities that might be prejudicial to its functions as a filler and to protect from corrosion the metal elements in which the product is stored at low temperature.

Polymer based additives, such as styrenebutadiene and/or ethylvinylacetate are preferable for such corrosion protection based upon their dosage which shall have the aim to extend the Fraas breakpoint from +10° to −45° C. so that the filler will still have a residual viscoelasticity at the minimum temperature limit.

Thus, the plain or hot-blown bitumen will have the following indicatory characteristics:

| | |
|---|---|
| penetration at 25° C. | 10–30 dmm |
| softening point | 80–115° C. |
| Fraas breakpoint | +10°—45° C. |
| ductility at 25° C. | min 2 cm |
| flash point | min 240° C. |
| specific gravity at 25/25° C. | 1.01–1.10 gr/cm3 |

It follows that, according to this invention, underground tanks for low temperature storage of liquid gases will allow for thermal oscillations causing a deformation of the metal structure in consistency with temperature values ranging from ambient to storage temperatures thus ensuring the maximum stress resisting interaction between the various tank components.

Obviously, this description regarding cylindrical tanks with horizontal axis and with flat or convex heads is also valid for tanks having any other configuration (whether upright, subvertical, spherical etc.).

What is claimed is:

1. An underground storage tank consisting of an internal metal containment structure (1), an outer static facing (2) in touch with surrounding soil (3) and a filler (5), poured between the metal structure (1) and the static facing (2) through first and second feed bushes (13, 15), the metal structure (1) being formed by rings (1*a*, 1*b*, 1*c*, 1*d*) placed side by side with some spacing and featuring transverse (4) and longitudinal channels, welded onto edges of these rings, for location and drainage of leaks, the transverse channels (4) being formed by omega sections (8) and flats (9), whereas horizontal channels are formed by flats (10, 11) and the metal structure (1) is supported by the static facing (2) by means of, insulating, U-bolts (20) to which the external omega sections (8) of the transverse channels (4) are secured, characterized in that:

a netting (6) is fastened by flat joint plates (7) positioned on the outside of the metal structure in the direction of a longitudinal tank axis, so that the netting (6) is embedded in the filler (5) and will act as a stabilizer;

vessels (18) are combined with the second feed bush and a third feed bush (15, 16) through which the filler (5) is charged in order to apply a greater load on the filler material, to provide for thickening of the filler (5) and a better bond to walls of the metal structure (1) and of the static facing (2), at least in an upper tank zone as well as to ensure optimum structural stability of the tank.

2. A tank as described in claim 1, characterized in that each ring (1*a*, 1*b*, 1*c*, 1*d*) of the metal structure (1) is fitted, before assembly, with joint plates (7*a*, 7*b*, 7*c*, 7*d*) for support and jointing of the netting (6*a*, 6*b*, 6*c*, 6*d*) to the related rings, so that after installation of the netting in circumferential sense, the netting (6*a*, 6*b* 6*c*, 6*d*) will slightly overlap.

3. A tank as described in claim 1, characterized in that round bars (12) having their axes parallel to the longitudinal tank axis, are welded onto outer surfaces of the transverse omega shapes (8) resting on the transverse end of the netting (6*a*, 6*b*, 6*c*, 6*d*), these bars (12) being embedded in the filler (5).

4. A tank as described in claim 1, characterized by the fact that a hot filler is poured through each of said feed bushes provided with a screw cap (14) and passes through the central flat portion of the omega section (8).

5. A tank as described in claim 4, characterized in that numerous feed bushes (13) are distributed on the periphery of some omega shaped sections (8).

6. A tank as described in claim 4, characterized in that the feed bushes (13) and those (15) provided with charging vessels (18) are fitted with proper devices for easy and fast installation and efficient distribution of the filler (5) inside the walls.

7. A tank as described in claim 1, characterized in that the second feed bush (15) with related screw cap (16) through which the filler (5) is poured into the upper tank zone of a hollow space of the tank, is fitted with an upwards extending pipe length (17) surrounded by a vessel (18) closed at a top thereof by an end plate (19) and open at a bottom thereof towards the hollow space to be filled, so that residual filler material in the vessel (18) will apply an additional load during filling to improve thickening and adhesion of the filler (5) to the walls.

8. A tank as described in claim 7, characterized in that the upper second feed bush (15) and the related charging vessels (18) are passing through the omega sections (8) located at the top of the tank.

9. A tank as described in claim 1, characterized in that the filler is hot-blown bitumen and that the hot-blown bitumen has the following average characteristics:

| | |
|---|---|
| penetration at 25° | 10 to 30 dmm |
| softening point | 80 to 115° C.- |
| Fraas breakpoint | −12° to +10° C. |
| ductility at 25° C. | min 2 cm |
| flash point | min 240° C. |
| specific gravity at 25/25° C. | 1.01 to 1.10 gr/cm$^3$. |

10. An underground Tank as described in claim 1 for low temperature storage of liquid gases, characterized in that:

the transverse channels (4) are formed by two omega sections (21, 22), the outer one of which (21) is resting on insulating, supporting U-bolts (20), the lower radial portion of each transverse channel (4) is fitted with a probe (23) for detection and location of at least one of liquid, vapour, and gas leaks;

all probes (23) are linked up to a properly sited central monitoring unit (24);

the filler (5) is one of hot-blown and plain bitumen with an additive to ensure continuous filling even at the very low temperature required for the stored product and sufficient residue viscoelasticity to guarantee interaction between all tank components and hence a better stability.

11. A tank as described in claim 10, characterized in that a polymer based additive is added to the bitumen, whether hot-blown or plain and, used as a filler between the metal structure (1) and the static facing (2).

12. A tank as described in claim 10, characterized in that the omega sections (21, 22) forming the transverse channels (4) for location and drainage of leaks are in one of a concentric and parallel position and that the inner section is in one of a right side up and upside down position with respect to the outer section.

13. A tank as described in claim 10 characterized in that the bitumen has the following characteristics:

| | |
|---|---|
| penetration at 25° | 10 to 30 dmm |
| softening point | 80 to 115° C.- |
| Fraas breakpoint | +10° to −45° C. |
| ductility at 25° C. | min 2 cm |
| flash point | min 240° C. |
| specific gravity at 25/25° C. | 1.01 to 1.10 gr/cm$^3$. |

14. The tank as described in claim 1 wherein the filler is hot-blown bitumen.

* * * * *